(12) United States Patent
Pattar et al.

(10) Patent No.: US 10,337,870 B2
(45) Date of Patent: Jul. 2, 2019

(54) EVACUATION SYSTEM AND METHOD FOR EVACUATING TRAPPED PERSONNEL

(71) Applicant: Wipro Limited, Bangalore (IN)

(72) Inventors: Adarsh Pattar, Bangalore (IN); Surendran Rajendran, Chennai (IN)

(73) Assignee: Wipro Limited, Bangalore (IN)

(*) Notice: Subject to any disclaimer, the term of this patent is extended or adjusted under 35 U.S.C. 154(b) by 105 days.

(21) Appl. No.: 15/460,871

(22) Filed: Mar. 16, 2017

(65) Prior Publication Data
US 2018/0216940 A1    Aug. 2, 2018

(30) Foreign Application Priority Data
Feb. 1, 2017   (IN) .............................. 201741003778

(51) Int. Cl.
*G01C 21/20*    (2006.01)
*H04W 4/80*    (2018.01)
(Continued)

(52) U.S. Cl.
CPC .............. *G01C 21/206* (2013.01); *A62B 3/00* (2013.01); *H04B 17/318* (2015.01); *H04W 4/80* (2018.02); *G08B 7/066* (2013.01); *H04W 4/02* (2013.01)

(58) Field of Classification Search
CPC ..... G01C 21/206; H04B 17/318; H04W 4/80; A62B 3/00
See application file for complete search history.

(56) References Cited

U.S. PATENT DOCUMENTS

| 7,312,752 B2 * | 12/2007 | Smith ..................... G01S 5/021 342/464 |
| 9,046,373 B2 * | 6/2015 | Bandyopadhyay .... G01C 17/38 |
| (Continued) | | |

FOREIGN PATENT DOCUMENTS

| CN | 103997781 | 8/2014 |
| KR | 20080035956 | 4/2008 |
| WO | 2008048059 A1 | 4/2008 |

*Primary Examiner* — Peter D Nolan
(74) *Attorney, Agent, or Firm* — Pepper Hamilton LLP (57) ABSTRACT

System and method for generating a dynamic route map for a person trapped in an enclosed space and for enabling quick evacuation of the person is disclosed. When a request for evacuation is made by the person, the evacuation system locates the person based on the RFID person identifier tag and localizes the location of the person with respect to plurality of RFID floor tags and plurality of self-identifying RFID reader antenna tags. Further, condition of the floor is assessed by comparing the RSSI readings of the plurality of RFID floor tags and the RSSI readings of the plurality of self-identifying RFID reader antenna tags and the environmental information with pre-defined baseline RSSI readings of the plurality of RFID floor tags, RSSI readings of the plurality of self-identifying RFID reader antenna tags and an environmental threshold. A dynamic floor map is generated by collecting the RSSI readings from the plurality of RFID floor tags, self-identifying RFID reader antenna tags. Subsequently, the condition of the rest of the floors is assessed by analyzing the environmental information from plurality of environmental sensors and assessing the working condition of RFID tags deployed at each floor. Finally, generating a dynamic route map such that emergency rescue operators can reach out to the trapped person in least amount of time.

14 Claims, 7 Drawing Sheets

(51) Int. Cl.
*H04B 17/318* (2015.01)
*A62B 3/00* (2006.01)
*H04W 4/02* (2018.01)
*G08B 7/06* (2006.01)

(56) References Cited

U.S. PATENT DOCUMENTS

| | | | |
|---|---|---|---|
| 9,544,923 B2* | 1/2017 | Gupta | H04W 4/90 |
| 9,569,649 B1* | 2/2017 | Hyre | G01N 27/20 |
| 9,693,197 B2* | 6/2017 | Varoglu | G01S 19/10 |
| 9,942,709 B2* | 4/2018 | Sung | G01S 5/02 |
| 2004/0078151 A1* | 4/2004 | Aljadeff | G01S 5/06 |
| | | | 702/40 |
| 2012/0047083 A1* | 2/2012 | Qiao | A62C 99/009 |
| | | | 705/325 |
| 2014/0222329 A1* | 8/2014 | Frey | G08B 7/066 |
| | | | 701/423 |
| 2015/0019124 A1* | 1/2015 | Bandyopadhyay | G01C 17/38 |
| | | | 701/410 |
| 2015/0271641 A1* | 9/2015 | Sung | G01S 5/02 |
| | | | 455/456.6 |
| 2016/0047663 A1* | 2/2016 | Iyer | G01C 21/3415 |
| | | | 701/411 |
| 2016/0143065 A1* | 5/2016 | Gupta | H04W 4/90 |
| | | | 455/404.2 |
| 2016/0216117 A9* | 7/2016 | Bandyopadhyay | G01C 17/38 |
| 2017/0052252 A1* | 2/2017 | Cristache | G01S 13/876 |

* cited by examiner

EVACUATION SYSTEM AND METHOD FOR EVACUATING TRAPPED PERSONNEL

This application claims the benefit of Indian Patent Application Serial No. 201741003778, filed Feb. 1, 2017, which is hereby incorporated by reference in its entirety.

TECHNICAL FIELD

The present invention in general relates to evacuation of persons from an enclosed space in emergency conditions. More particularly, the present invention relates to generating a dynamic route map for enabling evacuation of trapped persons

BACKGROUND

Under emergency conditions in large enclosed spaces such as manufacturing units or factories or mines, it is difficult for security personnel or rescue operators to locate each person and bring them out from a danger zone manually. The rescue operators have to locate each trapped person and they have to find best possible route to reach the person and bring the person out as soon as possible. It is also difficult for a person to evacuate the enclosed space in emergency conditions without any guidance on which route to take to make a quick exit from the enclosed space.

The existing evacuation systems depend primarily on the layout of the enclosed space. During an emergency, there is a possibility that there are floor collapses or there is a fire in one portion of the enclosed space. The existing systems in the art fail to consider such conditions when arriving at an evacuation plan. In such situations, the static layout or plan of the enclosed space may not be sufficient to enable an evacuation of the persons.

Some systems use infrared scanners for locating the trapped persons. These systems would be inefficient when there is a fire emergency. Moreover, implementation of such systems would be costly too.

SUMMARY

One or more shortcomings of the prior art are overcome and additional advantages are provided through the present disclosure. The techniques of the present disclosure enable realization of additional features and advantages. Other embodiments and aspects of the disclosure are described in detail herein and are considered a part of the claimed disclosure.

Disclosed herein is an evacuation system and method for assisting a person to evacuate from an enclosed space or in general, from any enclosed area. Such assistance may be provided by sending a dynamic route map to the person. In some embodiments, the dynamic route map may be sent to the mobile device of the person to enable the person to safely navigate to a safe zone. In other embodiments, the dynamic route map may be provided to rescue operators such that they may rescue the person.

In one embodiment, a method for generating a dynamic route map for a person in an enclosed space is disclosed. The method includes, receiving by a plurality of Radio-frequency identification (RFID) reader, Received Signal Strength Indicator (RSSI) readings of a plurality of RFID floor tags, RSSI readings of a plurality of self-identifying RFID reader antenna tags, RSSI readings of a person identifier tag associated with the person. The method further involves sensing environmental information by environmental sensors, comparing the RSSI readings of the person identifier tag with the RSSI readings of the plurality of RFID floor tags and the RSSI readings of the plurality of self-identifying RFID reader antenna tags to identify location of the person. The method further involves comparing at least one of the RSSI readings of the plurality of RFID floor tags and the RSSI readings of the plurality of self-identifying RFID reader antenna tags and the environmental information with pre-defined baseline RSSI readings of the plurality of RFID floor tags, pre-defined baseline RSSI readings of the plurality of self-identifying RFID reader antenna tags and an environmental threshold for assessing the condition of floor of the enclosed space. The method further generates a dynamic floor map. Thereafter, a dynamic route map is generated for the person based on identified location of the person, the condition of floor of the enclosed space, the dynamic floor map, RSSI readings of the plurality of RFID floor tags, RSSI readings of the plurality of self-identifying RFID reader antenna tags and the environmental information.

In another embodiment, a system for generating a dynamic route map for a person in an enclosed space is disclosed. The system includes a processor, a plurality of Radio-frequency identification (RFID) floor tags, a plurality of environmental sensors, a plurality of RFID readers, a plurality of RFID reader antennas and a plurality of self-identifying RFID reader antenna tags in pre-determined locations of the enclosed space and a memory communicatively coupled to the processor. The memory stores processor instructions, which on execution causes the processor to retrieve RSSI readings from the plurality of RFID readers. The RFID reader via the plurality of RFID reader antennas captures the RSSI readings by sensing at least one of RSSI readings of the plurality of RFID floor tags and RSSI readings of the plurality of self-identifying RFID reader antenna tags. The memory further stores processor instructions, which on execution, causes the processor to retrieve environmental information and compare the RSSI readings of the person identifier tag with the RSSI readings of the plurality of RFID floor tags and the RSSI readings of the plurality of self-identifying RFID reader antenna tags to identify location of the person. The processor instructions further include instructions to compare the environmental information, at least one of the RSSI readings of the plurality of RFID floor tags and the RSSI readings of the plurality of self-identifying RFID reader antenna tags with the environmental threshold, pre-defined baseline RSSI readings of the plurality of RFID floor tags and RSSI readings of the plurality of self-identifying RFID reader antenna tags to assess condition of floor of the enclosed space. The processor instructions further generate a dynamic floor map. Thereafter, processor instructions generate a dynamic route map for the person based on the identified location of the person, the condition of floor of the enclosed space, the dynamic floor map, the RSSI readings of the plurality of RFID floor tags, the RSSI readings of the plurality of self-identifying RFID reader antenna tags and the environmental information.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. Some embodiments of system and/or methods in accordance with embodiments of the present subject matter are now described, by way of example only, and with reference to the accompanying figures, in which.

It should be appreciated by those skilled in the art that the block diagrams herein represent conceptual views of illustrative systems embodying the principles of the present subject matter. Similarly, it will be appreciated that any flow charts, flow diagrams, state transition diagrams, pseudo code, and the like represent various processes that may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and an evacuation system (alternatively also referred as "system") for generating a dynamic route map for a person in an enclosed space. The enclosed space may be, but not limited to, a building, a mine, a manufacturing unit or a factory. Although, the method for generating the dynamic route map for the person is shown in conjunction with a server, the said method may also be implemented in various computing systems/devices, other than the server.

The system comprises a plurality of Radio-frequency identification (RFID) readers, a plurality of RFID reader antennas and a plurality of RFID floor tags deployed at pre-determined locations in an enclosed space. A plurality of self-identifying RFID reader antenna tags are associated with the plurality of RFID reader antennas. The plurality of self-identifying RFID reader antenna tags enable tracking the location of the plurality of RFID reader antennas. During floor collapses, there is a possibility that any of the plurality of RFID reader antennas may get dislocated. The presence of self-identifying RFID reader antenna tags enables identification of new location of the dislocated RFID reader antennas. Plurality of environmental sensors are deployed at pre-determined locations to sense environmental information. Readings from all these environmental sensors help the evacuation system to determine the environmental condition of the enclosed space thus enabling it to generate a dynamic floor map that would indicate floor collapses, danger prone areas and high temperature zones.

The person's location is identified based on a RFID person identifier tag associated with the person. In one embodiment, the location of the person is identified and then a dynamic route map may be generated from the person's location to the nearest exit. In another embodiment, the location of person may be identified and then a dynamic route map may be generated from the location of a rescue operator to the location of the person. The RFID reader antenna senses the (passive RFID) person identifier tag of the person and establishes the location of the person. Subsequently, a dynamic floor map may be generated and the location of the person may be plotted on the dynamic floor map. In one embodiment, where the person is accessing the evacuation system on a mobile device, the evacuation system would generate a dynamic route map to the exit. In another embodiment, where the rescue operators are lending support the evacuation system sends dynamic route map to the rescue operators to reach the person.

Accordingly, the present disclosure relates to a method of generating dynamic route map to evacuate a person from an enclosed space. The method comprises collecting the Received Signal Strength Indicator (RSSI) values sensed by RFID reader antennas from the plurality of RFID floor tags deployed in the enclosed space and from a plurality of self-identifying RFID reader antenna tags associated with the plurality of RFID reader antennas. Also, the method comprises collecting environmental information from one or more environmental sensors.

The pre-defined baseline RSSI readings of the plurality of self-identifying RFID reader antenna tags, pre-defined baseline RSSI readings of the plurality of RFID floor tags are collected initially when the self-identifying RFID reader antenna tags and RFID floor tags are deployed at pre-determined locations. Similarly, the pre-defined environmental information is collected from the environmental sensors initially when the environmental sensors are deployed. In addition, a floor condition threshold, a dynamic map threshold and a location map threshold are defined and stored in a database during the initial set up of the evacuation system. An environmental threshold is calculated based on the pre-defined baseline environmental information retrieved from all the floors. A maximum value from pre-defined environmental information of all the floors is determined and stored in the database as the environmental threshold.

Assessing the floor condition comprises calculating the first difference between a pre-defined baseline RSSI values of self-identifying RFID reader antenna tags with RSSI readings of the self-identifying RFID reader antenna tags and second difference between a pre-defined baseline RSSI readings of the plurality of RFID floor tags and RSSI readings of the plurality of RFID floor tags respectively. These differences are further compared with a floor condition threshold to determine the condition of floor. Similarly, environmental information is compared with the environmental threshold for further analyzing the condition of floor.

Locating a person in the enclosed space comprises calculating a third difference between the RSSI readings of the person identifier tag and RSSI readings of the self-identifying RFID reader antenna tags, calculating a fourth difference between the RSSI readings of the person identifier tag and RSSI readings of the plurality of RFID floor tags. When the third difference or the fourth difference is lower than a pre-defined location map threshold, the location of the nearest RFID floor tag or the nearest self-identifying RFID reader antenna tag is considered as the location of the person. The nearest self-identifying RFID reader antenna tag is the self-identifying RFID reader antenna tag that has the highest RSSI value. Further, when both the third difference and fourth difference are higher than the location map threshold, then, third difference is compared with the fourth difference. The centroid of three of the self-identifying RFID reader antenna tags is selected as the location of the person when the third difference is less than fourth difference. Alternatively, the centroid of three of the RFID floor tags is selected as the location of the person when the third difference is greater than the fourth difference.

Generation of dynamic map further comprises calculating a difference between the pre-defined baseline RSSI readings of the plurality of self-identifying RFID reader antenna tags, the plurality of RFID floor tags and the environmental threshold with current RSSI readings of the plurality of self-identifying RFID reader antenna tags, the plurality of RFID floor tags and current environmental information respectively. The difference thus calculated is compared with a floor condition threshold to identify the changes to the map. Dynamic map generation further comprises localizing the plurality of RFID reader antennas.

Localizing the plurality of RFID reader antennas comprises calculating a difference of the RSSI readings of plurality of self-identifying RFID reader antenna tags and the RSSI readings of the plurality of adjacent RFID floor tags. Here, the RFID floor tags in the coverage area of a particular RFID reader antenna may be considered "adjacent" to that particular RFID reader antenna. If, the calculated difference is less than the floor condition threshold, then it is inferred that the location of RFID reader antennas is the same as before i.e., location of RFID reader antennas would be the same as the pre-determined position. In other words, the floor condition is assumed unchanged. If the difference is greater than the floor condition threshold, then the location of the respective adjacent RFID floor tag is assigned to the respective RFID reader antenna. Here, the location of RFID floor tag is retrieved from the RFID floor tag which stores the initial location of the RFID floor tag. Similarly, each of the self-identifying RFID reader antenna tag stores an initial location of the RFID reader antenna with which self-identifying RFID reader antenna tag is associated. If the calculated difference is more than the dynamic map threshold, then centroid of three adjacent RFID floor tags or centroid of three adjacent self-identifying RFID reader antenna tags is considered to be the location of the self-identifying RFID reader antenna tag. Here, the adjacent RFID floor tags and adjacent self-identifying RFID reader antenna tags are selected from RFID floor tags and self-identifying RFID reader antenna tags respectively in the coverage area of the RFID reader antenna and having highest RSSI readings relative to the RFID reader antenna.

The method further checks the floor condition and the environmental condition of each of the floors and generates a dynamic route map.

Figure 1:
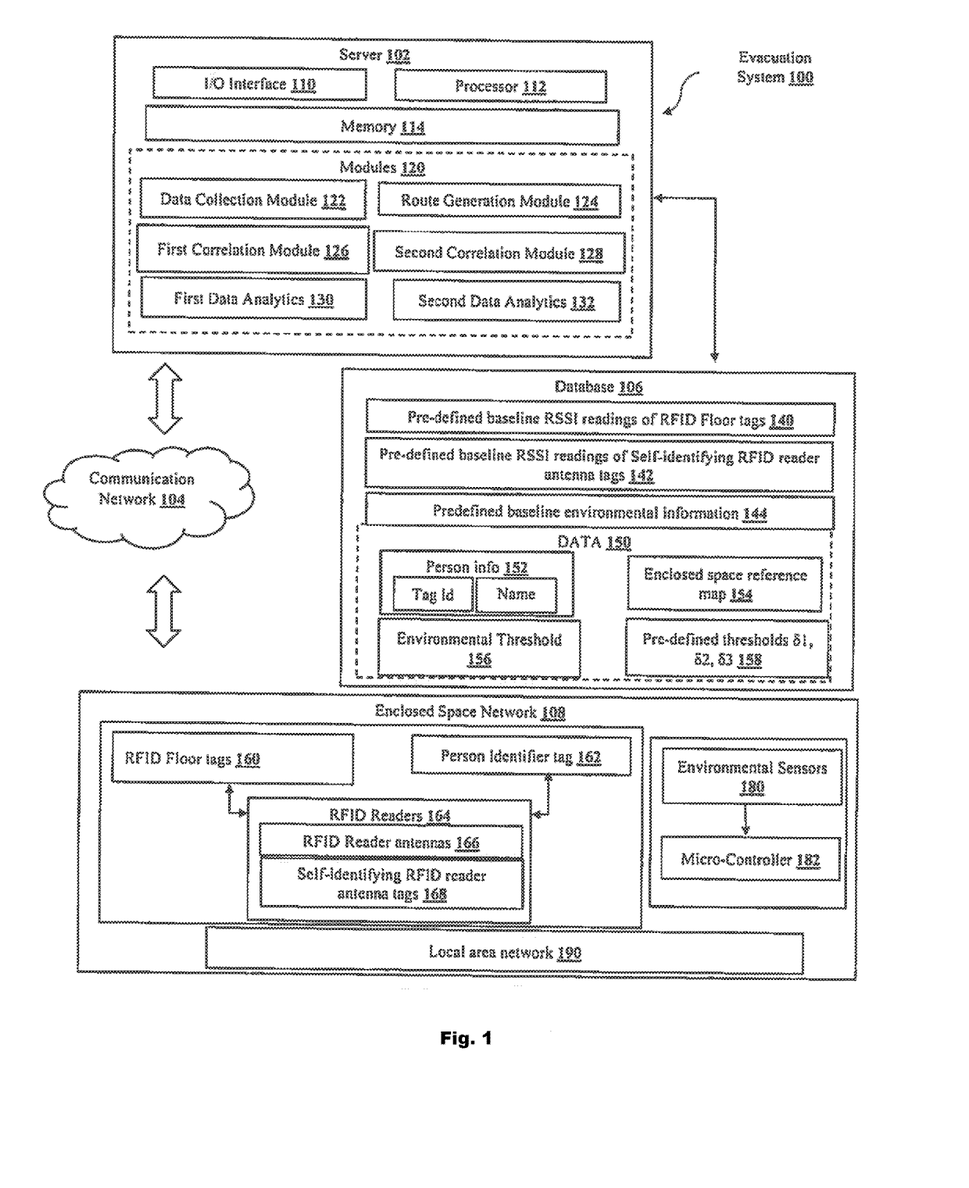
FIG. 1 shows a block diagram illustrating the evacuation system in accordance with some embodiments of the present disclosure.

FIG. 1 shows a detailed block diagram illustrating an evacuation system in accordance with some embodiments of the present disclosure. The evacuation system 100 may comprise a server 102, a communication network 104, a database 106, and an enclosed space network 108. The server 102 may comprise an I/O interface 110, a processor 112 and a memory 114. The I/O interface 110 is configured to receive data from various other networks such as the communication network 104 and write data to database 106. The memory 114 is communicatively coupled to the processor 112. The processor 112 is configured to generate a dynamic route map.

The evacuation system 100 may comprise modules 120 to execute various functions for generating dynamic route map. The modules 120 may comprise a data collection module 122, a first correlation module 126, a second correlation module 128, a first data analytics module 130 and a second data analytics module 132. The modules 120 may be connected via the communication network 104 to the enclosed space network 108. The enclosed space network 108 comprises RFID floor tags 160, a (RFID) person identifier tag 162 associated with a person, a plurality of RFID readers 164, a plurality of RFID reader antennas 166, a plurality of self-identifying RFID reader antenna tags 168 associated with plurality of RFID reader antennas 166, plurality of environmental sensors 180 and a local area network 190. The person identifier tag 162 is associated with the person, but not limited to, by embedding the person identifier tag in the person's uniform or affixing the person identifier tag 162 to a helmet of the person or used as a bracelet worn by the person. Each environmental sensor may comprise a microcontroller 182 for processing sensed environmental information. The modules 120 may retrieve information from the database 106.

Each floor of the enclosed space network 108 is distributed with the plurality of RFID floor tags 160. The plurality of RFID floor tags 160 include information regarding their initial location information written into them. The plurality of RFID floor tags 160 may be placed in places which are less prone to external disturbance. They might be fixed inside the sidewall (or) fixed inside the floor, so that they cannot be easily movable.

Each RFID reader 164 is connected with plurality of circularly polarized RFID reader antennas 166 distributed along the enclosed space floor. Each RFID reader antenna 166 is associated with self-identifying RFID reader antenna tag 168. The plurality of self-identifying RFID reader antenna tags 168 contain the initial location of the respective RFID reader antenna 166.

When RFID reader 164 queries the self-identifying RFID reader antenna tags 168 and the RFID floor tags 160, each RFID reader antenna 166 emits radio frequency power and captures the backscattered signal from every RFID floor tag 160 and every self-identifying RFID reader antenna tag 168 in its range. Thereafter, values of backscattered RFID signal strength of each of the plurality of self-identifying RFID reader antenna tags 168 and plurality of RFID floor tags 160 along with the time stamp information is written into the database 106.

Suppose antenna 'A$_i$' is the reader antenna 166, with A$_{ti}$ indicating the self-identifying RFID reader antenna tags 168 and F$_{ti}$ indicating the RFID floor tags 160, then the RSSI readings captured by reader antenna A$_i$, 166 is given by:

RSSI [[A$_{t1}$, A$_{t2}$, A$_{t3}$ ... A$_{tm}$], [F$_{t1}$, F$_{t2}$, F$_{t3}$ ... F$_{tn}$]]

Similarly, at a given time stamp 't'—

Time stamp 't' [A$_i$]=Time stamp 't' [[A$_{t1}$, A$_{t2}$, $_{At3}$ ... A$_{tm}$], [F$_{t1}$, F$_{t2}$, F$_{t3}$ ... F$_{tn}$]]

Where 'm' indicates number of self-identifying RFID reader antenna tags 168 in coverage area of RFID reader antenna 166, 'n' indicates number of RFID floor tags 160 in coverage area of RFID reader antenna 166.

The server 102 is a centralized computing system that processes the data from the plurality of RFID readers 164 and the plurality of environmental sensors 180. It is interfaced with the enclosed space network 108 via a Wi-Fi network. However, the channel of communication is not limited to Wi-Fi network, any channel of communication can be used to establish a connection between the server 102 and enclosed space network 108. The server 102 is also in communication with the database 106 for storing and retrieving data 150. The database 106 may include pre-defined baseline RSSI readings of RFID Floor tags 140, and pre-defined baseline RSSI readings of self-identifying RFID reader antenna tags 142. The pre-defined baseline RSSI readings of RFID floor tags 140 and pre-defined baseline RSSI readings of the self-identifying RFID reader antenna tags 142 are captured immediately after the initial set up of evacuation system and are stored in database 106. The initial readings of environmental sensors 180 stored as pre-defined baseline environmental information 144.

Database 106 may further include data 150, which may be stored within database 106 in the form of various data structures. Additionally or alternatively, the data 150 may be organized using data models, such as relational or hierarchical data models. The data 150 comprises information related to personnel (person information 152) who live/work in the enclosed space. Person information 152 may include tag id and person name. The data 150 may include a reference enclosed space map 154. Maximum value from the pre-defined baseline environmental information 144 is determined and stored as an environmental threshold 156 in the database 106. Pre-defined thresholds 158 such as floor condition threshold 'δ1', dynamic map threshold 'δ2', location map threshold 'δ3' may also be stored in the database 106.

Floor condition threshold 'δ1' is a single scalar value stored in the database 106, used to identify maximum deviation observed when pre-defined baseline RSSI readings of RFID Floor tags 140, pre-defined RSSI readings of self-identifying RFID reader antenna tags 142 are compared with RSSI readings of RFID floor tags 160 and RSSI readings of self-identifying RFID reader antenna tags 168 respectively. A difference is calculated between pre-defined RSSI readings of self-identifying RFID reader antenna tags 142 and RSSI readings of self-identifying RFID reader antenna tags 168 and a maximum of the difference value is considered as D1. Another difference is calculated between the pre-defined baseline RSSI readings of RFID floor tags 140 and RSSI readings of RFID floor tags 160 and a maximum of the difference value is considered as D2. If the difference D1 and D2 are greater than the floor condition threshold 'δ1', then the floor condition is changed.

Dynamic map threshold 'δ2' is a single scalar value stored in database 106, which is used while localizing a RFID reader antenna 166. The RFID reader antenna 166 is localized based on its associated self-identifying RFID reader antenna tag 168 and the associated self-identifying RFID reader antenna tag 168 is localized based on the nearest RFID floor tag 160. The RFID floor tag 160 has an initial location of the RFID floor tag 160 stored in it. The initial location that is stored in RFID floor tag 160 is used while localizing RFID reader antenna 166. That is, when the floor condition is changed, the evacuation system 100 uses the RFID floor tag's 160 location for determining the RFID reader antenna's 166 location. Similarly, each of the self-identifying RFID reader antenna tag 168 stores an initial location of the RFID reader antenna 166 with which self-identifying RFID reader antenna tag 168 is associated. Dynamic map threshold 'δ2' is used to assign RFID floor tag 160 location to self-identifying RFID reader antenna tags 168 whenever the floor condition is changed, i.e., if the difference between RSSI readings of the self-identifying RFID reader antenna tag 168 and the RSSI readings of RFID floor tags 160 is less than or equal to the dynamic map threshold 'δ2'.

Location map threshold 'δ3' is a single scalar value stored in the database 106. Location map threshold 'δ3' is used to identify the closest RFID floor tag 160 or closest self-identifying RFID reader antenna tag 168 w.r.t the person to be localized i.e., while locating the person. The closest RFID floor tag 160 or closest self-identifying RFID reader antenna tag 168 is determined based on the highest RSSI readings.

The data collection module 122 collects data from RFID readers 164 which is obtained from the plurality of RFID reader antennas 166 by sensing the plurality of RFID floor tags 160 and the plurality of self-identifying RFID reader antenna tags 168. The collected data comprises Received Signal Strength Indicator (RSSI) readings of RFID floor tags 160, self-identifying RFID reader antenna tags 168 and time stamps. The data collection module 122 also collects environmental information from the environmental sensors 180. The data collection module 122 forwards data obtained from RFID readers 164, environmental information collected from the environmental sensors 180 to the first correlation module 126 and second correlation module 128.

The first correlation module 126 queries for person information 152 and maps the tag id detected by the RFID reader antenna 166 to the person information obtained from database 106 to identify the person. The first correlation module 126 also receives the environmental information from the data collection module 122 and compares it with the environmental threshold 156. The first correlation module 126 also queries the pre-defined baseline RSSI readings 140 of the plurality of RFID floor tags 160 and the pre-defined baseline RSSI readings 142 of the plurality of self-identifying RFID reader antenna tags 168 associated with the plurality of the RFID reader antennas 166 from the database 106. The first correlation module 126 receives RSSI readings of RFID floor tags 160, self-identifying RFID reader antenna tags 168 from data collection module 122.

The first correlation module 126 correlates the environmental threshold 156 with environmental information received from the data collection module 122. The first correlation module 126 further correlates the pre-defined baseline RSSI readings of the plurality of RFID floor tags 140 with the RSSI readings of the RFID floor tags 160 received from data collection module 122. The first correlation module 126 also correlates the pre-defined baseline readings of self-identifying RFID reader antenna tags 142 with RSSI readings of self-identifying RFID reader antenna tags 168 received from data collection module 122. The first correlation module 126 passes the correlated information to first data analytics module 130 for further processing.

The first data analytics module 130 receives the information from first correlation module 126 and determines the condition of the floor by processing the RSSI readings of plurality of RFID floor tags 160 and the RSSI readings of self-identifying RFID reader antenna tags 168. The location of the person is identified by sensing the RSSI reading and time stamp information from the person identifier tag 162. The environmental information from the environmental sensors 180 is used to determine the condition of that floor where the person is located. The environmental information would comprise but not limited to temperature information. The environmental condition is determined by comparing the environmental information from the environmental sensors 180 with the environmental threshold 156. Maximum value from the pre-defined baseline environmental information 144 is determined and stored as the environmental threshold 156. Environmental information may be, but not limited to, temperature information. For example, if an enclosed space has three environmental sensors 180 and the environmental sensors 180 have pre-defined baseline environmental information 144 as 35° C., 39° C. and 40° C. Then the environmental threshold 156 is set at 40° C. (maximum of 35° C., 39° C. and 40° C.). Further, based on the floor condition and the person/person's location, the dynamic floor map of that floor may be generated. The floor area may be further divided into blocks with one RFID reader 164 deployed per block. The environmental sensors 180 may be deployed block-wise. The temperature of each block is assessed based on the plurality of environmental sensors 180 deployed in that block. In a given block, if the temperature is higher than the environmental threshold 150, then that block is marked as '0' and if the temperature is less than the environmental threshold 150, then that block is marked as '1'. Further, while generating the dynamic route map, the '1's' are connected to provide safe navigation.

The second correlation module 128 receives RSSI readings of the plurality of RFID floor tags 160, self-identifying RFID reader antenna tags 168 from data collection module 122 and environmental information from environmental sensors 180 from all floors. The second correlation module 128 queries the pre-defined baseline environmental information 144 from the database 106. The second correlation module 128 correlates the pre-defined baseline environmental information 144 with the environmental information received from data collection module 122. The second correlation module 128 further correlates the received RSSI readings of plurality of self-identifying RFID reader antenna tags 168 and RSSI readings of the plurality of RFID floor tags 160 from each floor and passes the correlated information to second data analytics module 132.

The second data analytics module 132 estimates the condition of each floor of the enclosed space with the help of RSSI values of the plurality of self-identifying RFID reader antenna tags 168, the plurality of RFID floor tags 160 and environmental information from environmental sensors 180. The second data analytics module 132 assesses whether majority of the RFID floor tags 160 in a given floor are accessible to the respective RFID reader antennas 166 deployed on that floor. Similarly, the second data analytics module 132 also assesses whether majority of the self-identifying RFID reader antenna tags 168 deployed on that floor are accessible to the respective RFID reader antennas 166 deployed on that floor. If majority of the RFID floor tags 160 or self-identifying RFID reader antenna tags 168 are not accessible then that floor is marked as '0'. If majority of the RFID floor tags 160 or self-identifying RFID reader antenna tags 168 are accessible then that floor is marked as '1'. Thus, the second data analytics module 132 estimates the condition of each of the floors. It also queries the enclosed space reference map 154 from the database 106 and forwards the enclosed space map reference 154 with estimated condition of each floor to route generation module 124.

The dynamic floor map from the first data analytics module 130 and the enclosed space reference map 154 from the second data analytics module 132 is fed to a route generation module 124. In one embodiment, the route generation module 124 generates a dynamic route map and forwards it to a mobile device of the trapped person. In another embodiment, the route generation module 124 generates a dynamic route map and sends it to mobile devices of rescue personnel to enable the rescue personnel to quickly locate the trapped person and perform a rescue operation.

Figure 2:
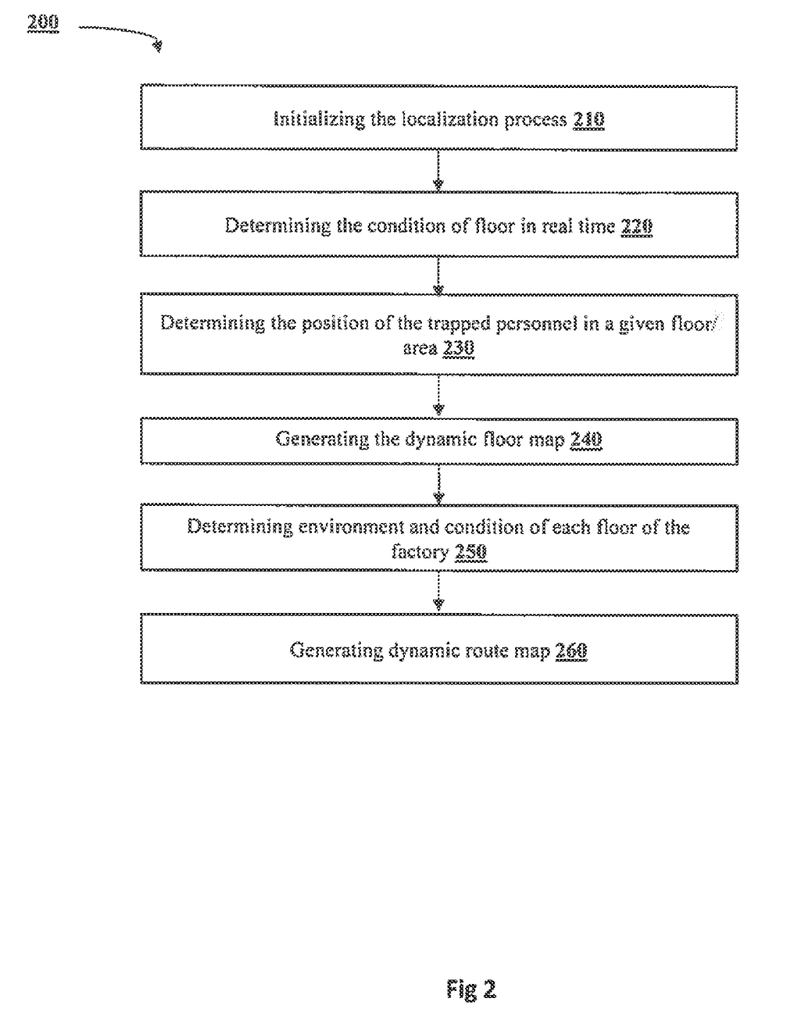
FIG. 2 shows a flowchart illustrating a method of generating a dynamic route map in accordance with some embodiments of the present disclosure.

FIG. 2 illustrates a method 200 of generating a dynamic route map in accordance with some embodiments of the present disclosure.

At step 210, the localization process of plurality of RFID floor tags 160 and plurality of self-identifying RFID reader antenna tags 168 takes place. Each floor of the enclosed space is distributed with the plurality of RFID floor tags 160 with inter tag distance '$\lambda$'. The RFID floor tags 160 are placed in a disturbance free zone. For example, these RFID floor tags 160 may be fixed to side walls or embedded in the floor. Plurality of RFID readers 164 for reading the RSSI values RFID floor tags 160 are also deployed on the floor.

Each RFID reader 164 is connected with multiple (circularly polarized) RFID reader antennas 166 distributed along the floor of the enclosed space. Each RFID reader antenna 166 is affixed with a self-identifying RFID reader antenna tag 168. The plurality of RFID floor tags 160 comprises an initial deployed location stored in them. As a part of localizing RFID floor tags 160 and self-identifying RFID reader antenna tags 168, pre-defined baseline RSSI readings of the plurality of RFID floor tags 140 and the pre-defined baseline RSSI readings of the plurality of self-identifying RFID reader antenna tags 142 are read by the plurality of RFID readers 164 via the plurality of RFID reader antennas 166 immediately after the initial setup of the evacuation system. The pre-defined baseline RSSI readings of the plurality of RFID floor tags 140 and the pre-defined baseline RSSI readings of the plurality of self-identifying RFID reader antenna tags 142 as read by each of the plurality of RFID reader antenna 166 are stored in database 106 against each of the reading RFID reader antenna 166.

When each of the plurality of the RFID readers 164 queries the RFID floor tags 160 and the plurality of self-identifying RFID reader antenna tags 168 in its coverage area, RFID reader antennas 166 associated with each of the plurality of RFID readers 164 beams a RF signal on RFID floor tags 160 and self-identifying RFID reader antenna tags 168 and captures backscattered signal (RSSI reading) from each of the plurality of RFID floor tags 160 and self-identifying RFID reader antenna tags 168. Thus, each of the plurality of the RFID readers 164 receives the RSSI readings from the plurality of RFID floor tags 160 and plurality of self-identifying RFID reader antenna tags 168.

Suppose RFID reader antenna 'Ai' 166 is scanning the plurality of RFID floor tags 160 and the plurality of self-identifying RFID reader antenna tags 168 in its coverage area, where Ati indicates one of the plurality of self-identifying RFID reader antenna tags 168 and Fti indicate one of the plurality of RFID floor tags 160. The RSSI readings captured by 'Ai' at a timestamp is shown by Timestamp[$A_t$]=Timestamp [RSSI ([$A_{t1}, A_{t2}, A_{t3} \ldots A_{tm}$], [$F_{t1}, F_{t2}, F_{t3} \ldots F_{tm}$])]

Where 'm' indicates number of self-identifying RFID reader antenna tags 168 in coverage area of the RFID reader antenna '$A_i$' 166, 'n' indicates number of RFID floor tags 160 in coverage area of the RFID reader antenna '$A_i$' 166.

Once the RFID floor tags 160 and self-identifying RFID reader antenna tags 168 are localized, at step 220 of FIG. 2, the floor where the person is trapped is identified and the condition of that floor is assessed in real time. The method of assessing the condition of the floor in real time is explained in conjunction with FIG. 3 and flowchart 300.

Figure 3:
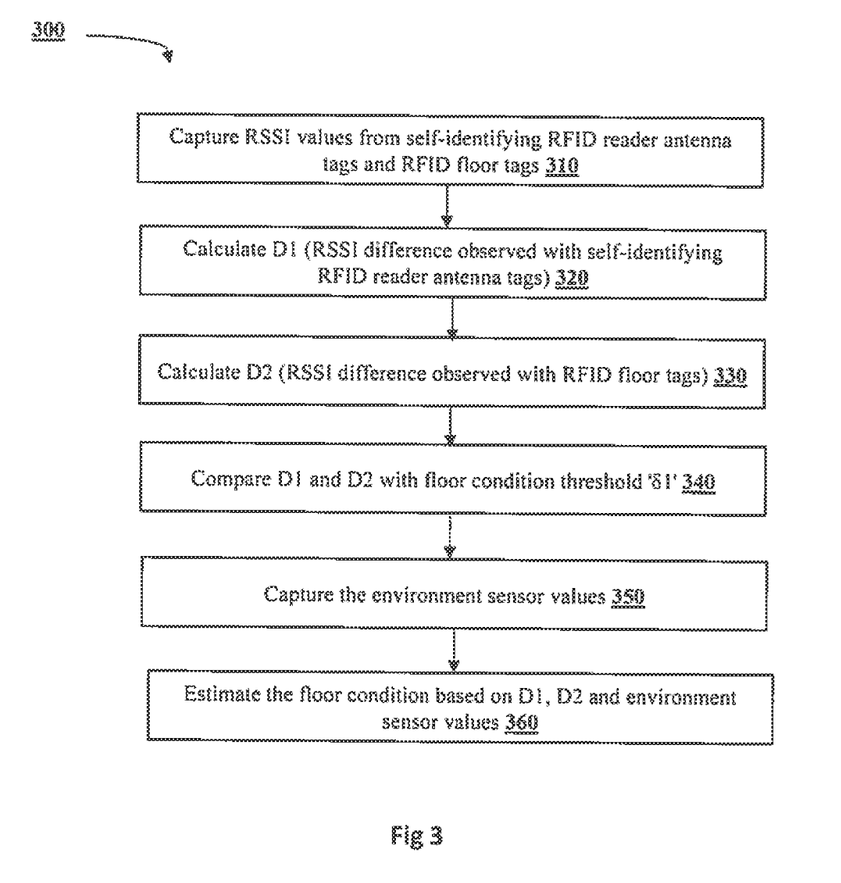
FIG. 3 shows a flowchart illustrating a method of evaluating the condition of floor in accordance with some embodiments of the present disclosure.

At step 310, in order to assess the condition of the floor, the RSSI readings of the plurality of self-identifying RFID reader antenna tags 168 and the plurality of the RFID floor tags 160 captured by each of the plurality of RFID reader antennas 166.

At step 320, a difference D1 is calculated between the RSSI values of the plurality of self-identifying RFID reader antenna tags 168 and pre-defined baseline RSSI values of the plurality of self-identifying RFID reader antenna tags 146:

D1=magnitude of (maximum of {RSSI [$A_{t1}, A_{t2}, A_{t3} \ldots A_{tm}$]–RSSI_pre-defined baseline readings [$A_{t1}, A_{t2}, A_{t3} \ldots A_{tm}$]})

Where $A_{ti}$ (i=1 to m) is self-identifying RFID reader antenna tag 168.

At step 330, a difference D2 is calculated between the RSSI values of the plurality of the RFID floor tags 160 and pre-defined baseline RSSI values of the plurality of the RFID floor tags 140.

D2=magnitude of (maximum of {RSSI [$F_{t1}, F_{t2}, F_{t3} \ldots F_{tm}$]–RSSI_pre-defined baseline readings [$F_{t1}, F_{t2}, F_{t3} \ldots F_{tm}$]})

Where $F_{ti}$ (i=1 to n) is a RFID floor tag 160.

At step 340, if the differences D1 and D2 are less than or equal to the floor condition threshold 'δ1' then the floor condition is considered to be unchanged. If the difference D2 is less than or equal to the floor condition threshold 'δ1', it indicates there is no significant change in RSSI readings of the RFID floor antenna tags 160 when compared to pre-defined baseline readings of self-identifying RFID reader antenna tags 142. Similarly, if the difference D1 is less than the floor condition threshold 'δ1', it indicates there is no significant change in RSSI readings of the self-identifying RFID reader antenna tags 168 when compared to pre-defined baseline readings of self-identifying RFID reader antenna tags 142. In step 350, the environment sensor values are captured and in step 360, the floor condition is estimated based on D1, D2, and environment sensor values.

For example, let the floor condition threshold 'δ1' is set at 50 dBm (decibel milli-watts), the RSSI readings of the self-identifying RFID reader antenna tags 168 be [At1 (70 dBm), At2 (60 dBm), At3 (55 dBm) and At4 (50 dBm)] and the pre-defined RSSI readings of self-identifying RFID reader antenna tags 142 be {RSSI pre-defined baseline readings [At1 (65 dBm), At2 (55 dBm), At3 (55 dBm) and At4 (50 dBm)}.

Difference D1=magnitude of (maximum of {[$A_{t1}$ (70 dBm), $A_{t2}$ (60 dBm), $A_{t3}$ (55 dBm) and $A_{t4}$ (50 dBm)]–RSSI_pre-defined baseline readings $A_{t1}$ (65 dBm), $A_{t2}$ (55 dBm), $A_{t3}$ (55 dBm) and $A_{t4}$ (50 dBm)})

Difference D1=magnitude of (maximum of {[5 dBm, 5 dBm, 0 dBm, 0 dBm]})

Difference D1=5 dBm.

Let the RSSI readings of the RFID floor tags 166 are [$F_{t1}$ (80 dBm), $F_{t2}$ (70 dBm), $F_{t3}$ (65 dBm) and $F_{t4}$ (60 dBm)] and pre-defined RSSI readings of RFID floor tags 140 be {RSSI pre-defined baseline readings [$F_{t1}$ (75 dBm), $F_{t2}$ (65 dBm), $F_{t3}$ (65 dBm) and $F_{t4}$ (60 dBm)]}.

Difference D2=magnitude of (maximum of {[$F_{t1}$ (80 dBm), $F_{t2}$ (70 dBm), $F_{t3}$ (65 dBm) and $F_{t4}$ (60 dBm)]–RSSI_pre-defined baseline readings [$F_{t1}$ (75 dBm), $F_{t2}$ (65 dBm), $F_{t3}$ (65 dBm) and $F_{t4}$ (60 dBm)]})

Difference D2=magnitude of (maximum of {[5 dBm, 5 dBm, 0 dBm, 0 dBm]})

Difference D2=5 dBm.

Comparing, D1 and D2 with the floor condition threshold 'δ1'. D1 and D2 are less than the floor condition threshold 'δ1', therefore, the floor condition is unchanged.

However, if the differences D1 and D2 are greater than the floor condition threshold 'δ1' then the floor condition is considered to be changed. When the differences D1 is greater than the floor condition threshold 'δ1', it implies that there is a significant change in RSSI readings of the RFID floor antenna tags 160 when compared to pre-defined baseline readings of self-identifying RFID reader antenna tags 142. Similarly, if the difference D2 is greater than the floor condition threshold 'δ1', it indicates there is a significant change in RSSI readings of the self-identifying RFID reader antenna tags 168 when compared to pre-defined baseline readings of self-identifying RFID reader antenna tags 142.

For example, let the floor condition threshold 'δ1' be 50 dBm, the RSSI readings of the self-identifying RFID reader antenna tags 168 be [$A_{t1}$ (70 dBm), $A_{t2}$ (60 dBm), $A_{t3}$ (55 dBm) and $A_{t4}$ (50 dBm)] and the pre-defined RSSI readings of self-identifying RFID reader antenna tags 142 be {RSSI pre-defined baseline readings [$A_{t1}$ (15 dBm), $A_{t2}$ (40 dBm), $A_{t3}$ (30 dBm) and $A_{t4}$ (20 dBm)]}.

Difference D1=magnitude of (maximum of {[$A_{t1}$ (70 dBm), $A_{t2}$ (60 dBm), $A_{t3}$ (55 dBm) and $A_{t4}$ (50 dBm)]–RSSI_pre-defined baseline readings [$A_{t1}$ (15 dBm), $A_{t2}$ (40 dBm), $A_{t3}$ (30 dBm) and $A_{t4}$ (20 dBm)]})

Difference D1=magnitude of (maximum of {[55 dBm, 20 dBm, 25 dBm, 40 dBm]})

Difference D1=55 dBm.

Let the RSSI readings of the RFID floor tags 166 be [$F_{t1}$ (80 dBm), $F_{t2}$ (70 dBm), $F_{t3}$ (65 dBm) and $F_{t4}$ (60 dBm)]} and the pre-defined RSSI readings of RFID floor tags 140 be {RSSI pre-defined baseline readings [$F_{t1}$ (15 dBm), $F_{t2}$ (20 dBm), $F_{t3}$ (0 dBm) and $F_{t4}$ (0 dBm)].

Difference D2=magnitude of (maximum of {[$F_{t1}$ (80 dBm), $F_{t2}$ (70 dBm), $F_{t3}$ (65 dBm) and $F_{t4}$ (60 dBm)]–RSSI_pre-defined baseline readings [$F_{t1}$ (15 dBm), $F_{t2}$ (20 dBm), $F_{t3}$ (0 dBm) and $F_{t4}$ (0 dBm)]})

Difference D2=magnitude of (maximum of {[65 dBm, 50 dBm, 65 dBm, 60 dBm]})

Difference D2=65 dBm.

Comparing, D1 and D2 with the floor condition threshold 'δ1'. D1 and D2 are greater than the floor condition threshold 'δ1', therefore, it is determined that the floor condition is changed.

Explanation with an Example:

Let $RSSI_{ts}$ of Person identifier tag=50 dBm and $RSSI_{ts}$ of Self-identifying RFID reader antenna tags be [$A_{t1}$ (10 dBm), $A_{t2}$ (15 dBm), $A_{t3}$ (25 dBm), $A_{t4}$ (30 dBm)]

D3=magnitude of [minimum of {$RSSI_{ts}$ ($P_i$)–$RSSI_{ts}$ ($A_{t1}, A_{t2} \ldots A_{ti}$)}]

Difference D3=magnitude of [minimum of {50 dBm−(10 dBm, 15 dBm, 20 dBm, 30 dBm)}]

Difference D3=magnitude of (minimum of {40 dBm, 35 dBm, 30 dBm, 20 dBm)})

Difference D3=20 dBm.

Figure 4:
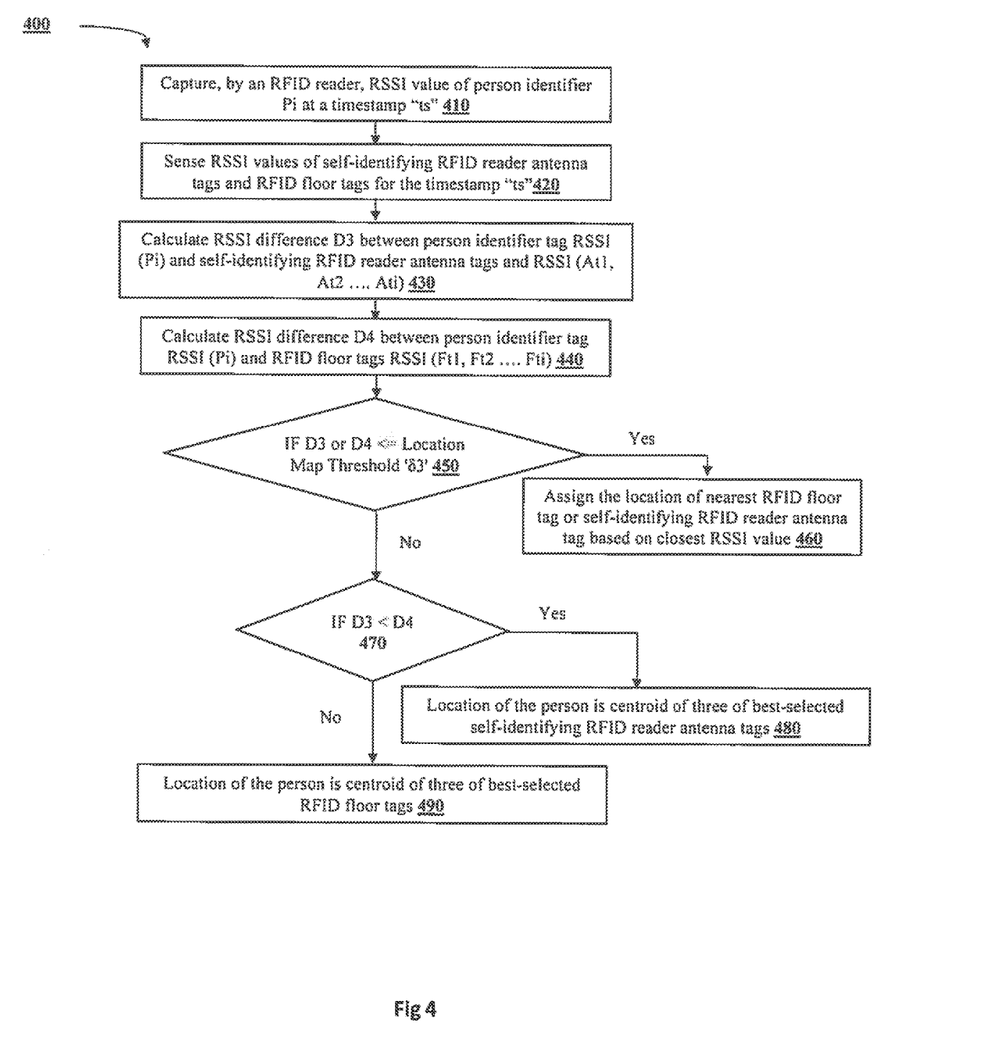
FIG. 4 shows a flowchart illustrating a method of determining the location of trapped persons in accordance with some embodiments of the present disclosure.

If the location map threshold 'δ3' is set at 50 dBm, then, as the difference D3 is 20 dBm is less than location map threshold 'δ3', the location of the $A_{t4}$ is assigned to be the location of the person identifier tag 162, as RSSI value of $A_{t4}$ is the highest among $(A_{t1}, A_{t2}, A_{t3}, A_{t4})$ Similarly, Let $RSSI_{ts}$ of Person identifier tag=50 dBm and the $RSSI_{ts}$ of RFID floor tags be $[F_{t1}$ (10 dBm), $F_{t2}$ (15 dBm), $F_{t3}$ (20 dBm), $F_{t4}$ (25 dBm)]

D4=magnitude of [minimum of $\{RSSI_{ts}(P_i)-RSSI_{ts}(F_{t1}, F_{t2}, \ldots F_{ti})\}]$ Difference D4=magnitude of [minimum of {50 dBm−(10 dBm, 15 dBm, 20 dBm, 25 dBm)}]

Difference D4=magnitude of [minimum of {40 dBm, 35 dBm, 30 dBm, 25 dBm)}]

Difference D4=25 dBm.

As the location map threshold 'δ3' is set at 50 dBm, and the difference D4 is 25 dBm which is less than location map threshold 'δ3', then the location of the $F_{t4}$ is assigned to be the location of the person identifier tag $P_i$ 162, as RSSI value of $F_{t4}$ is the highest among $(F_{t1}, F_{t2}, F_{t3}, F_{t4})$ FIG. 4 including the flowchart 400 illustrates identifying the location of a person. In step 410, RSSI value of the person identifier Pi is captured by an RFID reader at a timestamp "ts". In step 420, RSSI values of self-identifying RFID reader antenna tags and RFID floor tags are sensed for the timestamp "ts". Next in step 430, the RSSI difference D3 between person identifier tag RSSI (Pi) and self-identifying RFID reader antenna tags and RSSI (At1, At2. . . Atl) is calculated. Next in step 440, RSSI difference D4 between person identifier tag RSSI (Pi) and RFID floor tags RSSI (Ft1, Ft2, . . . Fti) is calculated. In step 460, the location of the nearest RFID floor tag or self-identifying RFID reader antenna tag is assigned based on closest RSSI value. If D3 or D4 is not less than location map threshold 'δ', then, at step 470, D3 is compared with D4.

If D3 is lesser than D4, the centroid of three self-identifying RFID reader antenna tags 168 is assigned as the location of the person identifier tag 162 as shown in step 480. If D3 is lesser than D4 it indicates that the RSSI values of the self-identifying RFID reader antenna tags 168 are higher than the RSSI values of the RFID floor tags 160.

As described in the above example, D3 (20 dBm) is lesser than D4 (25 dBm). Here at least one of the RSSI values of self-identifying RFID reader antenna tags 168 is greater than the RSSI values of RFID floor tags 160. At least one of $[A_{t1}$ (10 dBm), $A_{t2}$ (15 dBm), $A_{t3}$ (25 dBm), $A_{t4}$ (30 dBm)]>$[F_{t1}$ (10 dBm), $F_{t2}$ (15 dBm), $F_{t3}$ (20 dBm), $f_{t4}$ (25 dBm)], i.e., RSSI value of $A_{t4}$>$[F_{t1}$ (10 dBm), $F_{t2}$ (15 dBm), $F_{t3}$ (20 dBm), $f_{t4}$ (25 dBm)].

As the RSSI value of $A_{t4}$ is greater than all the RSSI values of the RFID Floor tags 160, the centroid of three of the self-identifying RFID reader antenna tags 168 with highest RSSI values i.e., the centroid of three of the self-identifying RFID reader antenna tags 168 with minimum RSSI difference from the difference array D3 is selected to be the location of the person identifier tags 162.

location of (P$_i$)=centroid (locations of 3 self-identifying RFID reader antenna tags with minimum RSSI difference from the difference array D3)

As per the above example,

Location of (Pi)=centroid $(A_{t2}, A_{t3}, A_{t4})$ as they have the minimum difference in the array $[RSSI (P_i)−RSSI (A_{t1}, A_{t2}, A_{t3}, A_{t4})]$ [40 dBm, 35 dBm, 30 dBm, 20 dBm]. Therefore selecting centroid of $A_{t2}, A_{t3}$ and $A_{t4}$ from $[A_{t1}$ (10 dBm), $A_{t2}$ (15 dBm), $A_{t3}$ (25 dBm), $A_{t4}$ (30 dBm)].

If D3 is greater than D4, then, at step 490, centroid of three RFID floor tags 160 with highest RSSI values i.e., centroid of three RFID floor tags 160 with minimum RSSI difference from the difference array D4 is assigned to be location of the person.

location of (P$_i$)=centroid (locations of 3 RFID floor tags with minimum RSSI difference from the difference array D4).

In step 230, the position of the trapped personnel in a given floor/area is determined. At step 240 of FIG. 2, on determining the location of the person, a dynamic floor map may be generated at step 240. The method for generating a dynamic floor map is explained in conjunction with FIG. 5 and flowchart 500.

Figure 5:
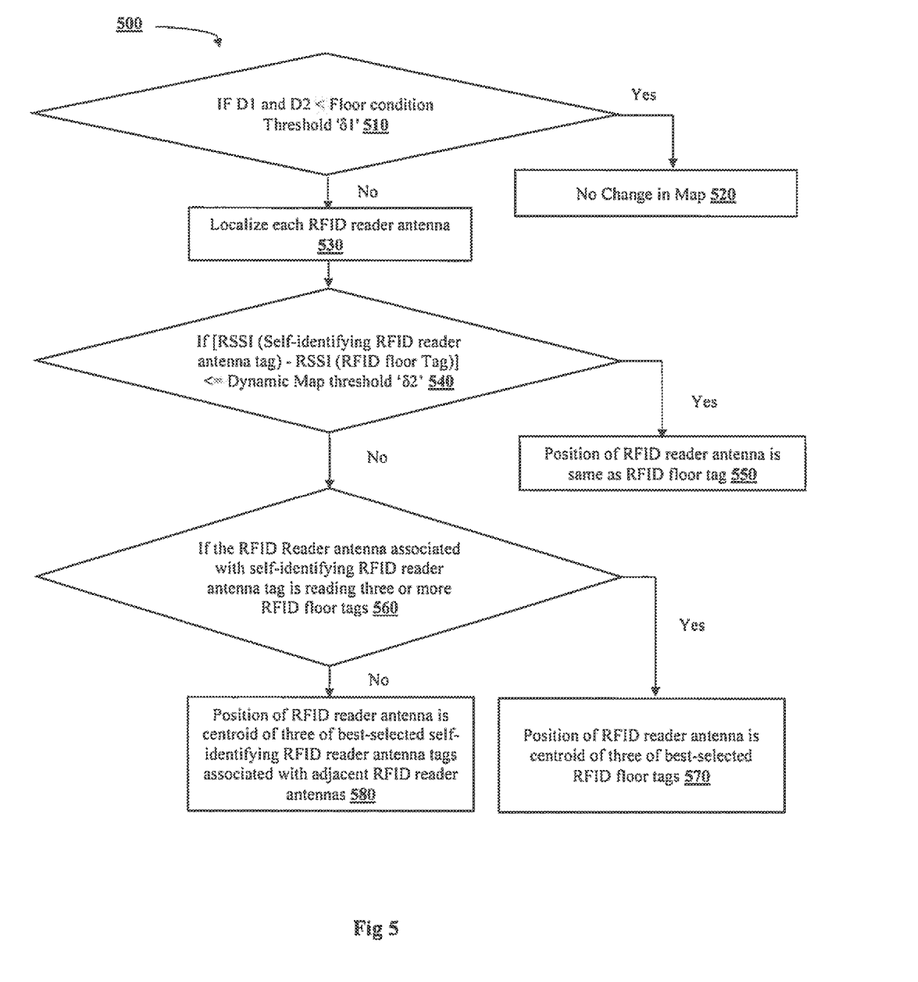
FIG. 5 shows a flowchart illustrating a method of generating a dynamic floor map in accordance with some embodiments of the present disclosure.

At step 510, D1 (maximum RSSI difference between RSSI readings of the plurality of self-identifying RFID reader antenna tags 168 and pre-defined baseline RSSI readings 142 of the plurality of self-identifying RFID reader antenna tags 168), D2 (maximum RSSI difference between RSSI readings of the plurality of RFID floor tags 160 and pre-defined baseline RSSI readings 140 of the plurality if RFID floor tags 160) obtained in method 220 are compared again with floor condition threshold 'δ1'. If the differences D1 and D2 are less than floor condition threshold 'δ1', the floor is unchanged and the enclosed space reference map 154 can be used as it is as shown in step 520. The comparison of the differences D1 and D2 with the floor condition threshold 'δ1' is illustrated with an example in step 340. However, when the differences D1 and D2 are greater than the dynamic map threshold 'δ2', step 530 is executed.

At step 530, each of plurality of RFID reader antennas 166 is localized. The RFID reader antennas 166 are localized at subsequent steps 540 through 580.

At step 540, for a given RFID reader antenna 166 to be localized the difference between RSSI values of a self-identifying RFID reader antenna tag 168 associated with the given RFID reader antenna 166 and the closest RFID floor tag 160 is calculated. If the calculated difference is less than or equal to dynamic map threshold 'δ2', then the location of respective RFID floor tag 160 is assigned to be the location of the given RFID reader antenna 166 as shown in step 450. The closest RFID floor tag 160 has the maximum RSSI reading when compared to all the other RFID floor tags 160 scanned by the given RFID reader antenna 166.

Mathematical representation of above comparison:

$$RSSI(A_{ti})-RSSI(F_{ti})<='δ2'.$$

For example, if the RSSI value of self-identifying RFID reader antenna tag 168 is 70 dBm and the RSSI value of closest RFID floor tag 160 (with maximum RSSI value) is 60 dBm. The difference of RSSI value of self-identifying RFID reader antenna tag 168 and RSSI value of RFID floor tag 160 is 10 dBm. The dynamic map threshold 'δ2' is set at 50 dBm. The condition RSSI $(A_{ti})$−RSSI $(F_{ti})$<='δ2' (10 dBm<=50 dBm) is satisfied. It can be inferred that there is at least one RFID floor tag 160 which is near to the RFID reader antenna 166 and the RFID reader antenna 166 can be localized w.r.t the RFID floor tag 160 and the location of the RFID floor tag 160 is set to be the location of the RFID reader antenna 166.

However, if the difference between RSSI values of the self-identifying RFID reader antenna tag 168 and the closest RFID floor tag 160 is greater than dynamic map threshold '$\delta 2$'.

For example, if the RSSI value of self-identifying RFID reader antenna tag 168 is 70 dBm and the RSSI value of closest RFID floor tag 160 (with maximum RSSI value) is 10 dBm. The difference of RSSI value of self-identifying RFID reader antenna tag 168 and RSSI value of RFID floor tag 160 is 60 dBm. The dynamic map threshold '$\delta 2$' is set at 50 dBm.

The difference RSSI (Ati)–RSSI (Fti) (60 dBm) is greater than the dynamic map threshold '$\delta 2$' (10 dBm), which indicates that none of the RFID floor tags are near to the reader antenna hence a single RFID floor tags location cannot be set as a location of the reader antenna. Subsequently step 560 executes.

At step 560, if the RFID reader antenna 166 associated with self-identifying RFID reader antenna tag 168 is reading three or more RFID floor tags 160 then the location of the RFID reader antenna 166 may be localized to centroid of three RFID floor tags 160 with highest RSSI values as shown in step 570. If the RFID reader antenna 166 associated with the self-identifying RFID reader antenna tag 146 is not reading any of the RFID floor tags 160, the procedure at step 580 to be executed.

$$pos(A_i) = centroid\ [pos(F_{t2}), pos(F_{t1}), pos(F_{t3})]$$

where Ai is the RFID reader antenna 166; $F_{t1}$, $F_{t2}$ and $F_{t3}$ are RFID floor tags 160 with maximum RSSI values as read by RFID reader antennas 166 when compared to RSSI values read from other plurality of RFID floor tags 160.

As the RFID reader antenna 166 is unable to read three or more RFID floor tags 160, at step 580, the RFID reader antenna 166 is localized to the centroid of at least 3 self-identifying RFID reader antenna tags 146 with highest RSSI values.

$$pos(A_i) = centroid[pos(A_{t1}), pos(A_{t2}), pos(A_{t3})]$$

where Ai is the RFID reader antenna 166 whose localization is carried out and $A_{t1}$, $A_{t2}$ and $A_{t3}$ are self-identifying RFID reader antenna tags 146 with maximum RSSI values as read by the RFID reader antenna 166 when compared to RSSI values read from other plurality of self-identifying RFID reader antenna tags 146.

A dynamic floor map is thus generated from the output of steps 550, 570 and 580.

At step 250 of FIG. 2, each floor is assessed for its condition and temperature. The step 250 is explained in conjunction with FIG. 6 and flowchart 600.

Figure 6:
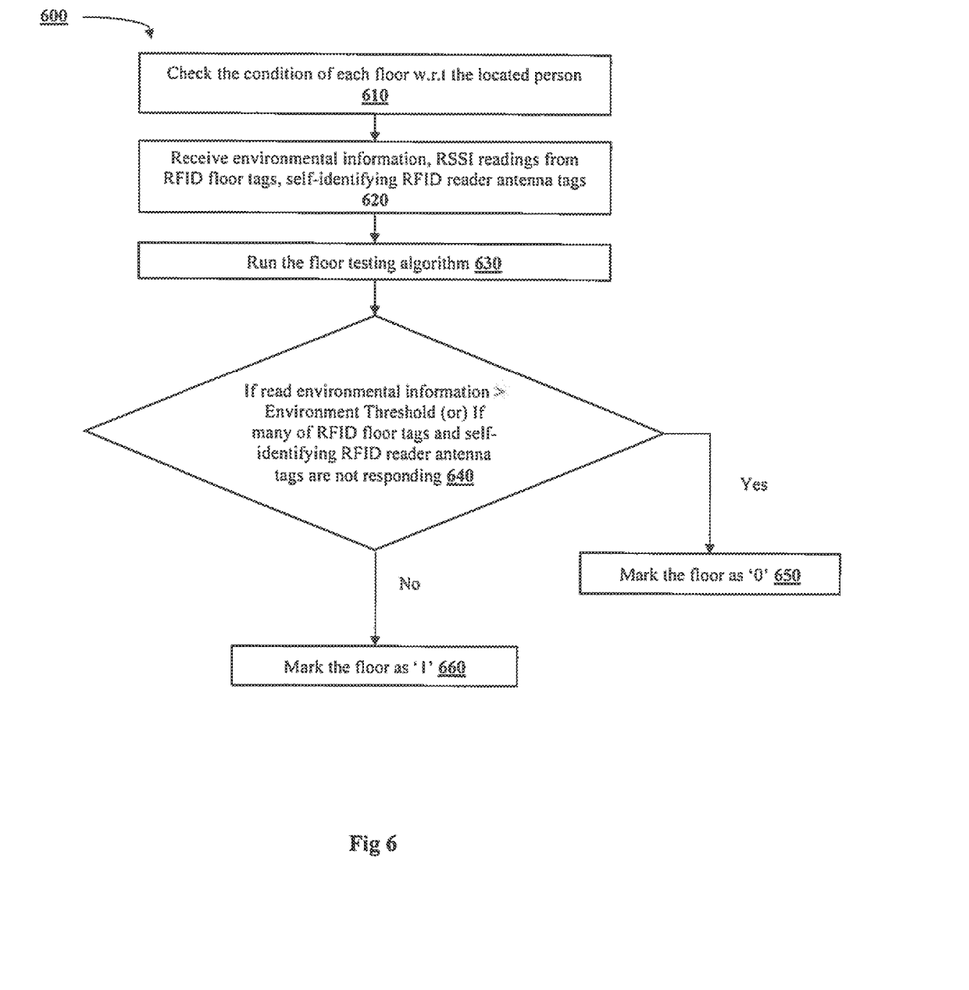
FIG. 6 shows a flowchart illustrating a method of assessing the environmental condition and condition of the floor in accordance with some embodiments of the present disclosure.

As illustrated in FIG. 6, the method of assessing the condition each of the floors comprises one or more steps for determining environmental condition and condition of each floor in the enclosed space using an evacuation system 100.

At step 610, the evacuation system 100 receives a request for checking the condition of the each of the remaining floors with respect to the person localized using method 240.

At step 620, the evacuation system 100 receives environmental information from environmental sensors 180, RSSI information from the RFID floor tags 160 and the self-identifying RFID reader antenna tags 168.

At step 630, a floor test algorithm is initiated which would execute along the steps 640, 650 and 660.

At step 640, the floor test algorithm compares the environmental information of each floor with the environmental threshold 156 derived from the pre-defined baseline environmental information 144. The floor test algorithm also checks if most of the RFID floor tags 160 and the self-identifying RFID reader antenna tags 168 of each floor are responding to the plurality of RFID reader antennas 166. In an instance where the environmental information of a floor is more than the environmental threshold 156 that floor is marked as '0'. Similarly, if many of the RFID floor tags 160 and the self-identifying RFID reader antenna tags 168 are not responding that floor is also marked as '0' as shown in step 650. However, when the environmental information of the floor is less than the environmental threshold 156, the floor is marked with '1' also when most of the RFID floor tags 160 and self-identifying RFID reader antenna tags 168 of a given floor are responding that floor is marked with '1'. The environmental information may be, but not limited to temperature information.

Now referring back to the step 260 of method 200 as shown in flow chart of FIG. 2. After receiving the information related to condition of each floor information in the form of '1's' and '0's', the evacuation system 100 generates a dynamic route map using previously generated dynamic floor map and the output of floor test algorithm.

In one embodiment where the emergency rescue operator's support is required, the evacuation system 100 generates a dynamic route map by connecting all connects all marked '1's' while using the previously generated dynamic map from emergency rescue operator to estimated location of trapped person and send the map to mobile device of rescue operator.

In an alternative embodiment where the person is capable of evacuating himself/herself, the evacuation system 100 generates dynamic route map using previously generated dynamic map and connecting all marked '1's' in the reference enclosed space map from estimated location of the person to an evacuation area.

Computer System

Figure 7:
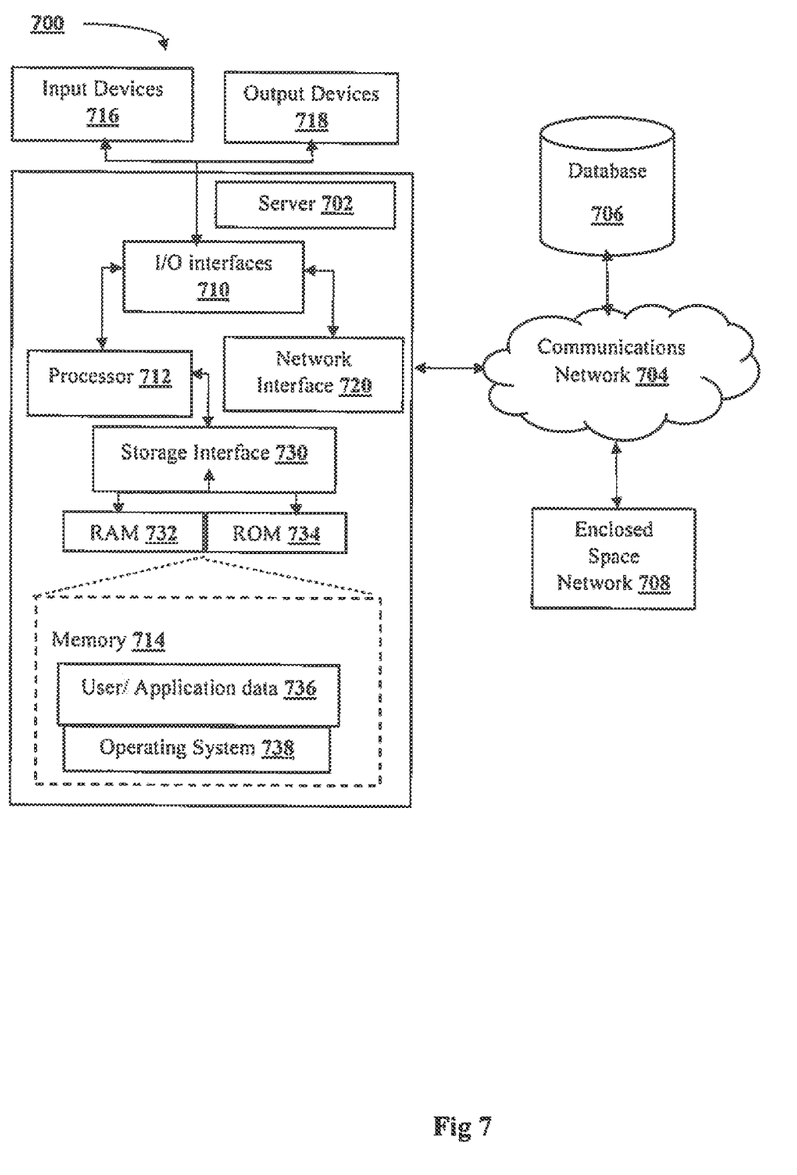
FIG. 7 is a block diagram of an exemplary computer system for implementing embodiments consistent with the present disclosure.

FIG. 7 illustrates a step diagram of an exemplary computer system 700 for implementing embodiments consistent with the present invention. In an embodiment, the computer system 700 can be the central computer system of the evacuation system 101 which is used for generating the dynamic map, locating a trapped person and generating a dynamic route map. The computer system 700 may comprise a central processing unit ("CPU" or "processor") 712. The processor 712 may comprise at least one data processor for executing program components for executing user-generated or system-generated business processes. The processor 712 may include specialized processing units such as integrated system (bus) controllers, memory management control units, floating point units, graphics processing units, digital signal processing units, etc.

The processor 712 may be disposed in communication with one or more input/output (I/O) devices (716 and 718) via I/O interface 710. The I/O interface 710 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 710, the computer system 700 may communicate with one or more I/O devices (716 and 718).

In some embodiments, the processor 712 may be disposed in communication with a communication network 704 via a network interface 720. The network interface 720 may communicate with the communication network 704. The network interface 720 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. The communication network 704 can be implemented as one of the different types of networks, such as intranet or Local Area Network (LAN) and such within the organization. The communication network 704 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 704 may include a variety of network devices, including routers, bridges, servers, computing devices, storage devices, etc. Further, the database 706 may include, but not limited to, clinical sources, hospice item set (HIS), legacy system, social media etc. FIG. 7 also includes the enclosed space network 708.

In some embodiments, the processor 712 may be disposed in communication with a memory 714 (e.g., RAM 732, ROM 734, etc. as shown in FIG. 7) via a storage interface 730. The storage interface 730 may connect to memory 714 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 714 may store a collection of program or database components, including, without limitation, user/application data 736, an operating system 738 etc. In some embodiments, computer system 700 may store user/application data 736, such as the data, variables, records, etc. as described in this invention. Such databases may be implemented as fault-tolerant, relational, scalable, secure databases such as Oracle or Sybase.

The operating system 738 may facilitate resource management and operation of the computer system 700. Examples of operating systems include, without limitation, Apple Macintosh OS X, UNIX, Unix-like system distributions (e.g., Berkeley Software Distribution (BSD), FreeBSD, Net BSD, Open BSD, etc.), Linux distributions (e.g., Red Hat, Ubuntu, KUbuntu, etc.), International Business Machines (IBM) OS/2, Microsoft Windows (XP, Vista/7/8, etc.), Apple iOS, Google Android, Blackberry Operating System (OS), or the like. I/O interface 710 may facilitate display, execution, interaction, manipulation, or operation of program components through textual or graphical facilities. For example, I/O interface 710 may provide computer interaction interface elements on a display system operatively connected to the computer system 700, such as cursors, icons, check boxes, menus, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, JavaScript, AJAX, HTML, Adobe Flash, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer readable medium" should be understood to include tangible items and exclude carrier waves and transient signals, i.e., non-transitory. Examples include Random Access Memory (RAM), Read only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Explained Herein

In an embodiment, the present disclosure provides a method for generating dynamic map based on values received from the RFID tags deployed at the evacuation scenario.

In an embodiment, the method of present disclosure locates trapped person by accessing the person identifier tag 162 associated with the trapped person and localizing it with respect to the deployed RFID floor tags 160 and the self-identifying RFID reader antenna tags 168 at the enclosed space.

In an embodiment, the method of present disclosure provides a dynamic route map to the emergency rescue operators to reach out to the trapped persons.

In an alternative embodiment, the present disclosure provides a dynamic route map to the trapped person to exit the enclosed space.

In an embodiment, the method of present disclosure generates the dynamic route map by assessing the environmental condition of each of the floors of the enclosed space. Also, by assessing whether the RFID tags deployed at a given floor are responding to the RFID reader 164.

In an embodiment, the method of present disclosure generates the dynamic route map by assessing the floor collapses by localizing the RFID reader antenna 166.

In an embodiment the system uses passive RFID tags, which are easy to deploy and economical. Usage of passive RFID tags eliminates frequent assessment for battery life of RFID tags.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of generating a dynamic route map for a person in an enclosed space, the method comprising:
    receiving by a RFID reader via a plurality of RFID reader antennas, Received Signal Strength Indicator (RSSI) readings of a plurality of RFID floor tags, RSSI readings of a plurality of self-identifying RFID reader antenna tags, RSSI readings of a person identifier tag associated with the person;
    sensing, by environmental sensors, environmental information;
    comparing the RSSI readings of the person identifier tag with the RSSI readings of the plurality of RFID floor tags and the RSSI readings of the plurality of self-identifying RFID reader antenna tags to identify a location of the person;
    comparing the RSSI readings of the plurality of RFID floor tags and the RSSI readings of the plurality of self-identifying RFID reader antenna tags and the environmental information with pre-defined baseline RSSI readings of the plurality of RFID floor tags, RSSI readings of the plurality of self-identifying RFID reader antenna tags and an environmental threshold for assessing the condition of floor of the enclosed space;
    generating a dynamic floor map based on the RSSI readings of the plurality of RFID floor tags and the RSSI readings of the plurality of self-identifying RFID reader antenna tags; and
    generating a dynamic route map for the person based on identified location of the person, the dynamic floor map, the condition of the floor of the enclosed space, the RSSI readings of the plurality of RFID floor tags, the RSSI readings of the plurality of self-identifying RFID reader antenna tags and the environmental information.

2. The method of claim 1 wherein the RFID reader and the RFID reader antennas are connected via a local network to upload the RFID readers' readings to a remote server for processing.

3. The method of claim 1 wherein the person identifier tag is associated with the person by at least one of: embedding the person identifier tag in the person's uniform, affixing the person identifier tag to a helmet of the person, or used as a bracelet worn by the person.

4. The method of claim 1 wherein identifying the location of the person comprises:
    calculating a first difference between the RSSI readings of the person identifier tag and RSSI readings of the self-identifying RFID reader antenna tags;
    calculating a second difference between the RSSI readings of the person identifier tag and the RSSI readings of the plurality of RFID floor tags; and
    determining the location of the person by comparing the first difference and second difference with a location map threshold.

5. The method of claim 4 wherein determining the location of the person further comprises:
    determining the location of the RFID floor tag having a maximum RSSI reading or the self-identifying RFID reader antenna tag having a maximum RSSI reading when the first difference and the second difference is lower than the location map threshold.

6. The method of claim 5 wherein determining the location of the person comprises:
    determining at least one of a centroid of self-identifying RFID reader antenna tags and a centroid of plurality of RFID floor tags when the first difference and second difference is higher than the location map threshold.

7. The method of claim 1 wherein generating a dynamic floor map comprises localizing each of the plurality of RFID reader antennas.

8. A system for generating a dynamic route map for a person in an enclosed space, comprising:
    a processor; and
    a plurality of Radio-frequency identification (RFID) floor tags;
    a plurality of environmental sensors;
    a plurality of RFID readers, a plurality of RFID reader antennas, a plurality of self-identifying RFID reader antenna tags in pre-determined locations of the enclosed space and a memory communicatively coupled to the processor, wherein the memory stores processor instructions, which, on execution, causes the processor to:
    receive RSSI readings from the plurality of RFID readers via the plurality of RFID reader antennas, wherein the RSSI readings are captured by the RFID reader antennas by sensing at least one of RSSI readings of the plurality of RFID floor tags, and RSSI readings of the plurality of self-identifying RFID reader antenna tags,
    retrieve environmental information, wherein the environmental information is derived from the plurality of the environmental sensors;
    compare the RSSI readings of the person identifier tag with the RSSI readings of the plurality of RFID floor tags, the RSSI readings of the plurality of self-identifying RFID reader antenna tags to identify a location of the person
    compare the RSSI readings of the plurality of RFID floor tags, and the RSSI readings of the plurality of self-identifying RFID reader antenna tags and environmental information with pre-defined baseline RSSI readings of the plurality of RFID floor tags,RSSI readings of the plurality of self-identifying RFID reader antenna tags and an environmental threshold to assess condition of the floor of the enclosed space;

generate a dynamic floor map based on the RSSI readings of the plurality of RFID floor tags and the RSSI readings of the plurality of self-identifying RFID reader antenna tags; and generate a dynamic route map for the person based on the identified location of the person, the dynamic floor map, the condition of floor of the enclosed space, the RSSI readings of the plurality of RFID floor tags, the RSSI readings of the plurality of self-identifying RFID reader antenna tags and the environmental information.

9. The system of claim 8 wherein the plurality of RFID readers and the plurality of RFID reader antennas are connected via a local network and upload the RFID reader antenna readings to a remote server for processing.

10. The system of claim 9 wherein the person identifier tag is associated with the person by means of embedding the person identifier tag in the person's uniform or affixing the person identifier tag to helmet of the person or using the identifier tag as a bracelet worn by the person.

11. The system of claim 8, wherein comparing the RSSI readings by the processor comprises:
calculating a first difference between the RSSI readings of the person identifier tag and the RSSI readings of the self-identifying RFID reader antenna tags calculating second difference between the RSSI readings of the person identifier and the plurality of RFID floor tag readings; and determining the location of the person by comparing the first difference and a second difference with the location map threshold.

12. The system of claim 11 wherein determining the location of the person further comprises:
determine the location of the RFID floor tag having a maximum RSSI reading or the self-identifying RFID reader antenna tag having a maximum RSSI reading when the first difference and second difference is lower than the location map threshold.

13. The system of claim 12 wherein determining the location of the person further comprises:
determine a centroid of self-identifying RFID reader antenna tags or a centroid of plurality of RFID floor tags as location of the user when both the first difference and second difference are higher than the location map threshold.

14. The system of claim 8 further comprises localizing each of the plurality of RFID reader antennas.

* * * * *